Jan. 26, 1960
E. A. TURATI
2,922,605
PARACHUTES
Filed May 21, 1957
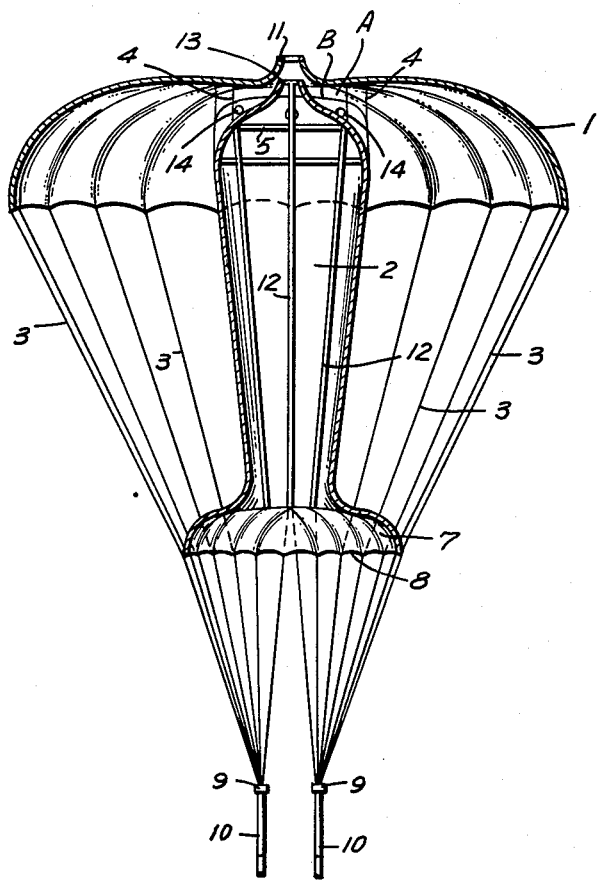
INVENTOR.
Enrico A Turati

United States Patent Office 2,922,605
Patented Jan. 26, 1960

2,922,605

PARACHUTES

Enrico A. Turati, Armenia, Colombia

Application May 21, 1957, Serial No. 660,506

1 Claim. (Cl. 244—149)

This invention relates to a novel parachute consisting of a main canopy, an auxiliary canopy and a stabilizing collapsible fuselage between the canopies.

Modern aeronautical requirements demand that parachutes descend nearly vertically, despite strongly lateral winds. Parachutes also must have a slow rate of descent. This is particularly true where fragile cargo is dropped from airplanes. Further, to avoid injury to the parachutist by being dragged along the ground by this parachute after landing, the canopy should collapse as rapidly as possible. Generally speaking, prior art parachutes have been constructed in such a way that they open vertically. This characteristic results in their being useless below a certain altitude.

In line with above-indicated requirements, and with a view to departing from conventional constructions and modes of operation, the principal object of this invention is to provide a parachute of novel design which may be opened safely at very low altitude, and will open horizontally parallel to the ground.

A related object of the invention is the provision of a parachute which cannot fail to open regardless of how poorly it has been packed.

Another object of the invention is to provide a parachute having a canopy which collapses immediately upon touching the ground.

A further object of this invention is to provide a parachute having only a moderate effect on the chutist upon opening owing to its having a first canopy, the preliminary opening of which exercises a slight braking effect, and causes the opening of the second or conventional canopy.

These and other related objects and advantages of the present construction will become obvious as the description thereof proceeds, particularly when taken in connection with the accompanying drawing, the single figure of which is a vertical section of a parachute in accord with the invention.

In the drawings, similar reference characters indicate identical parts.

As shown, the parachute of the invention consists of a main canopy 1, preferably of generally hemispherical shape, slightly flattened at its center, and having an outlet opening at its geometric center. The size of the opening is made adjustable by securing thereto a ring of hard rubber or other resilient material 11, enclosed in a scabbard formed by sewing around the ring. The canopy may be fabricated of natural silk or of any other material conventionally used in parachutes.

Positioned centrally below canopy 1 is a tubular truncated member 2 having preferably the shape of a converted frustum of cone 2.

This member, by its rudder-like action, stabilizes the parachute, and will be referred to hereinafter as a "stabilizer."

The stabilizer, as will be described hereinafter, terminates in a canopy 7 of lesser circumference than canopy 1. The length of the stabilizer is critical, and should equal the radius of canopy 1. This is necessary in order that when the parachute is folded, or in a pack, the entire length of the stabilizer will be within the folds of canopy 1, letting out only auxiliary canopy 7. This results in canopy 7 opening immediately when the parachute is used, thus conveying air into the stabilizer and thence to the main canopy 1.

As shown, the upper end of the stabilizer has a spherical cap B, which may be formed integrally therewith, or sewn thereto. The canopy 1 and the stabilizer 2 are fastened together coaxially, leaving a space A of about 4 inches between the lower surface of the canopy and the upper end of the stabilizer. Fastening is effected by means of ropes or cables 4, extending from the upper end of the stabilizer to shroud lines 3 depending from canopy 1. Ropes 4 are fastened also to ropes 5 and 6, which surround the stabilizer at a point immediately below the spherical cap forming the upper end thereof. The eight ropes 4 extend lengthwise along the stabilizer, fitting in their respective scabbards 12 sewn along the entire length of the inner surface of the stabilizer. The ends of ropes 4 emerge from the scabbards, and are knotted to four different steel rings 9, of which two are shown, the other two lying immediately behind them in Fig. 1. Straps 10 extend from the rings. A harness or other cargo-bearing attachment may be secured to these straps.

Also attached to the rings 9 are the extremities of the eight shroud lines 3 depending from canopy 1.

It will be seen that ropes 4 define a number of sectors 8, which form the small canopy 7.

It will be readily seen that the shroud lines 3 holding the main canopy 1 define generally a conic area; the vertex of this area being at the union of the lines with the rings 9.

Shroud lines 3 and ropes 4 meet, and are secured together by knotting or otherwise, at the outer periphery of auxiliary canopy 7.

As shown axially below the central opening in canopy 1, lies the center of the spherical cap B, forming the upper end of the stabilizer. This cap is provided with an extensible opening 13, and with four to six smaller openings 14, each positioned equi-distantly from the other along the periphery of the cap. These openings may be rendered extensible by constructing them like outlet opening 11.

It has been observed that parachutes made according to the invention open in two steps. As soon as the parachute is freed from its pack, the auxiliary canopy opens directing air into the stabilizer, which funnels air, in turn, into the main canopy by means of the openings 14 provided in its upper end. In this manner the main canopy opens more rapidly, and more uniformly with consequently less shock to the parachutist than conventional parachutes.

Owing to the ratio of the length of the stabilizer to the radius of the main canopy, and to the short distance of the harness from the auxiliary canopy, the stabilizer is forced in a position wherein its longitudinal axis coincides with the line on which lies the center of gravity of the person or cargo secured to the harness. Since gravity tends to render this line perpendicular to the ground, the stabilizer takes instantaneously a vertical position. Because of the relative shortness of the lines extending from the outer periphery of the main canopy to the outer periphery of the auxiliary canopy, the main canopy will open horizontally to the ground instead of vertically as most prior art parachutes. Opening of the auxiliary canopy and of the stabilizer causes a first braking action on the descent. This first effect lessens the shock caused by the main braking action of the main canopy. Accordingly, less damage will be caused to fragile cargo. This feature renders the parachutes of the invention particularly useful in dropping medicines and the like to a specific spot.

During descent, the stabilizer of the invention is filled with air pressurized by the force of the descent. Since the surface of the outlet openings 13 and 14 in the stabilizer is small by comparison with the inlet surface, there results a continuous stream of air at a constant pressure (owing to the expansibility of the openings), having a direction opposite to that of the chute. This stream tends to keep the parachute descending vertically.

Air escaping from the peripheric outlets 14 in the stabilizer contributes an increment of drag, as it will act in clearance "A" against the lower surface of the main canopy. Additionally, the work input caused by pressurizing air in the stabilizer contributes further to the drag. Again to minimize oscillations, pressure immediately under the main canopy and in clearance "A" is kept uniform by the expansibility of opening 11, through which escapes excess air taken in by the stabilizer.

As a result of the relatively short distance of the harness to the auxiliary canopy, as soon as landing is effected, the stabilizer will immediately collapse, causing the simultaneous collapse of the main canopy. For best results it has been found that the distance from rings 9 to the outer lower periphery of canopy 7 should be about one-half the distance from the upper surface of canopy 7 to the lower outer periphery of canopy 1.

Various tests were conducted which demonstrated the superiority of the parachute of the invention over conventional chutes. In demonstrating that impact upon landing is very small, boxes of brown sugar cubes were dropped from a height of about 750 feet onto a hard concrete floor. Not one sugar cube or box was broken. By contrast, every time the test was duplicated with conventional parachutes, the boxes and cubes were broken into many pieces, and scattered all around the ground.

To further illustrate the success of the invention, the following tests are given:

| | |
|---|---|
| Diameter of main canopy | 24 feet. |
| Weight of cargo dropped | 45 kilograms (99 lbs.). |
| Altitude dropped | 1000 feet. |
| Time required for descent | 82 seconds. |
| Average velocity of descent | 12 feet/second. |
| Time needed to open parachute | 2 seconds. |
| Barometric pressure | 30. |
| Wind velocity | West 10 miles. |

| | |
|---|---|
| Diameter of main canopy | 22 feet. |
| Weight of cargo dropped | 52 kilograms (114 lbs.). |
| Altitude of plane | 750 feet. |
| Time of descent | 45 seconds. |
| Average descent velocity | 16.6 feet/sec. |
| Time required to open chute | 2 seconds. |
| Barometric pressure | 29.2. |
| Wind | 2 miles per hour. |

| | |
|---|---|
| Diameter of main canopy | 12 feet. |
| Weight of cargo dropped | 30 lbs. |
| Time of descent | 68 seconds. |
| Average velocity of descent | 14.7 feet/second. |
| Time to open parachute | 2 seconds. |
| Barometric pressure | 29.9. |
| Wind | 5 miles per hour. |

The increased load carrying ability for a given size of canopy is believed due to the stabilizer.

The above-outlined tests were performed at the Military Air Base of "El Guabito" near Cali, Colombia.

It was observed that the parachutes never failed to open. It was also noted that they opened in two steps and horizontally as indicated before. Regardless of lateral wind velocity, it was observed that the parachutes of the invention landed almost vertically below the spot of launching. This is to be contrasted with the performance of conventional parachutes, which often land miles away from the point of launching.

The foregoing results are all the more remarkable because the parachutes tested were fabricated by unskilled workers from the natural silk salvaged from parachutes obsolete in 1935. In no case were the tolerances indicated hereinabove closely adhered to.

What is claimed is:

A parachute characterized by its ability to open horizontally with respect to the ground, said parachute comprising in combination a generally hemispherical main canopy; shroud lines depending therefrom; a collapsible stabilizer element having generally the shape of an inverted frustum of cone of slightly greater diameter at its upper portion than at its lower part, said stabilizer element being positioned centrally below said main canopy at a distance sufficient to provide a clearance therebetween, said stabilizer element terminating at its lower end in an auxiliary canopy of lesser diameter than said main canopy and terminating at its upper end in a spherical cap having a centrally positioned expansible air outlet, and a plurality of small expansible air outlets on the periphery thereof, the length of said stabilizer element being equal to the radius of said main canopy; a plurality of lines concentrically surrounding said stabilizer immediately below said cap, and having fastened thereto guide lines extending from the lower surface of said main canopy; scabbards provided therefor along the length of said stabilizer; said guide lines being fastened also to the outer periphery of said auxiliary canopy; a plurality of ring means joining said guide lines and said shroud lines; and cargo bearing means secured to said rings, the distance from said rings to the outer lower periphery of said auxiliary canopy being about one-half the distance from the upper surface of said auxiliary canopy to the lower outer periphery of said main canopy.

References Cited in the file of this patent

UNITED STATES PATENTS

| | | |
|---|---|---|
| 1,303,976 | Smith | May 20, 1919 |
| 1,723,122 | Barwiciki | Aug. 6, 1929 |
| 1,802,325 | Broadwick | Apr. 28, 1931 |
| 2,196,947 | Swofford | Apr. 9, 1940 |
| 2,282,234 | Minich | May 5, 1942 |

FOREIGN PATENTS

| | | |
|---|---|---|
| 334,365 | Great Britain | Sept. 4, 1930 |